(No Model.)
L. C. SNELL.
MEANS FOR FACILITATING THE PASSAGE OF OIL THROUGH PIPES AND MAKING ILLUMINATING GAS.
No. 290,491. Patented Dec. 18, 1883.
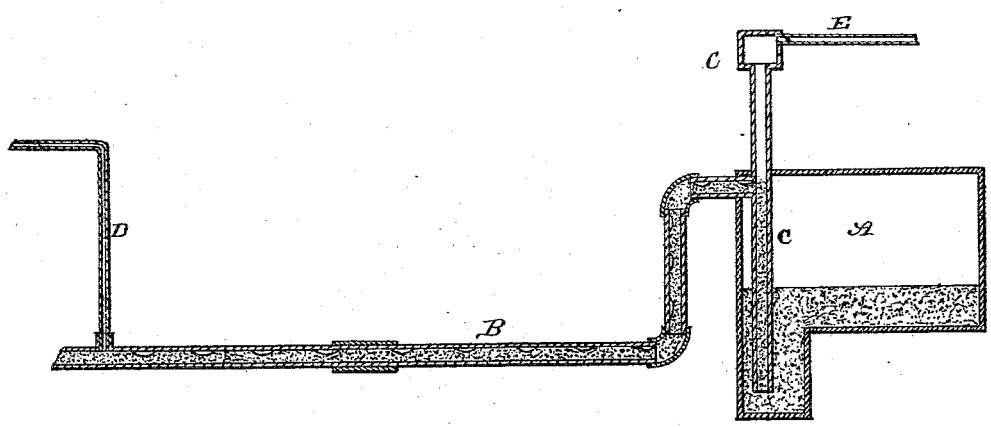
Witnesses.
Louis F. Gardner
J. W. Garner
Inventor.
L. C. Snell
per
J. A. Lehmann,
Atty.

United States Patent Office.

LUTHER C. SNELL, OF OLEAN, NEW YORK, ASSIGNOR OF ONE-TENTH TO JOHN L. BAXTER, OF SAME PLACE.

MEANS FOR FACILITATING THE PASSAGE OF OIL THROUGH PIPES AND MAKING ILLUMINATING-GAS.

SPECIFICATION forming part of Letters Patent No. 290,491, dated December 18, 1883.

Application filed May 8, 1883. (No model.)

*To all whom it may concern:*

Be it known that I, LUTHER C. SNELL, of Olean, in the county of Cattaraugus and State of New York, have invented certain new and useful Improvements in Combined Means for Facilitating the Passage of Oil Through Pipes, and for Making an Illuminating-Gas; and I do hereby declare the following to be a full, clear, and exact description of the invention, such as will enable others skilled in the art to which it pertains to make and use it, reference being had to the accompanying drawing, which forms part of this specification.

My invention relates to an improvement in the transmission of oil or other liquids through pipes; and it consists in the introduction of air by means of any suitable air-forcing mechanism into the pipe through which the oil or other liquid is flowing, for the purpose of forming a cushion in the pipe, increasing the velocity of the oil, and at the same time carbureting air, so as to adapt it to be used for heating or illuminating purposes, as will be more fully described hereinafter.

The object of my invention is to introduce air into long pipes through which oil is transmitted from one point to the other, for the double purpose of easing the friction of the oil upon the pipes and preparing the air to be used for heating or illuminating purposes.

The accompanying drawing represents an apparatus which embodies my invention.

A represents an oil-tank into which the oil is to be forced, and B the pipe through which the oil is conducted from a distance into the tank. The oil will be forced through this pipe B by means of a pump or any other suitable apparatus for this purpose. No such apparatus is shown, because a pump, gravity, or any other means may be used for forcing the oil along. In order to facilitate the passage of the oil from this pipe B, there will be connected to the pipe B a suitable pipe, D, through which air will be forced by means of a pump or any other suitable air-forcing mechanism into pipe B. The air may be forced either by the pump which forces the oil along through the pipe B, or by separate air-forcing mechanism provided especially for this purpose. Should gravity be used and the velocity of the oil through the pipe B be very great, the air may be sucked in through the pipe D. I do not limit myself to any precise manner of introducing the air, as this may be done in any manner that may be preferred. At the end of the pipe B, inside of the tank A, is secured a pipe, C, which has a gas-pipe, E, provided with a check-valve, secured to its upper end, and through which the air which has become carbureted by its passage through the pipe B with the oil is carried away to any source, to be used either for heating or illuminating purposes. The air which is forced into the pipe B travels along with the oil in the shape of bubbles in the upper part of the pipe, and thus forms an elastic cushion for the oil, for the purpose of decreasing the friction of the oil upon the pipes and increasing the rapidity of the flow of oil through them. The air, in flowing along through the pipe, takes up more or less room, and as the air both takes up room in the pipe and decreases the friction of the oil upon the pipe, and as the same pressure is applied to the oil to force it along, it will readily be seen that the oil is made to move more rapidly through the pipe. As the air forms a cushion for the oil, it enables it to glide smoothly over the joints in the pipe, without the great strain upon the pipe which always takes place where no air is introduced for the purpose of facilitating the passage of the oil. The air expands equally in every direction and causes the strain of the oil in the pipes to be equally distributed throughout its length, and thus prevent unequal pressure from rupturing the pipes, as frequently occurs. When the oil reaches the pipe C, it drops down through the pipe into the tank A, while the air rises upward into the pipe E and is carried away. This separation takes place automatically.

I am aware that compressed air and steam have been injected at the bottom of a vertical pipe in which water is to be raised for the purpose of forcing the water upward and aerating it, and this I disclaim. My invention differs from this in forcing air into long lines of horizontal piping through which oil is to be transported to a distant point, and for the purpose of decreasing the friction of the moving fluid against the pipes, for the purpose of preventing the oil from bursting the pipes, and for the purpose of carbureting the air.

Having thus described my invention, I claim—

1. The combination of a line of piping, B, through which oil is transported, and means for forcing air into the pipes while the oil is passing through, for the purpose of forming a cushion in the pipes, substantially as shown.

2. The combination of the tank A, into which the oil is forced, the pipe B, through which the oil is conducted, and pipe D, for conveying air into the pipe B, and the pipe E, for carrying away the gas, substantially as set forth.

In testimony whereof I affix my signature in presence of two witnesses.

LUTHER C. SNELL.

Witnesses:
   THOS. STORRS.
   P. KAWEALOAR.